Figure 5:
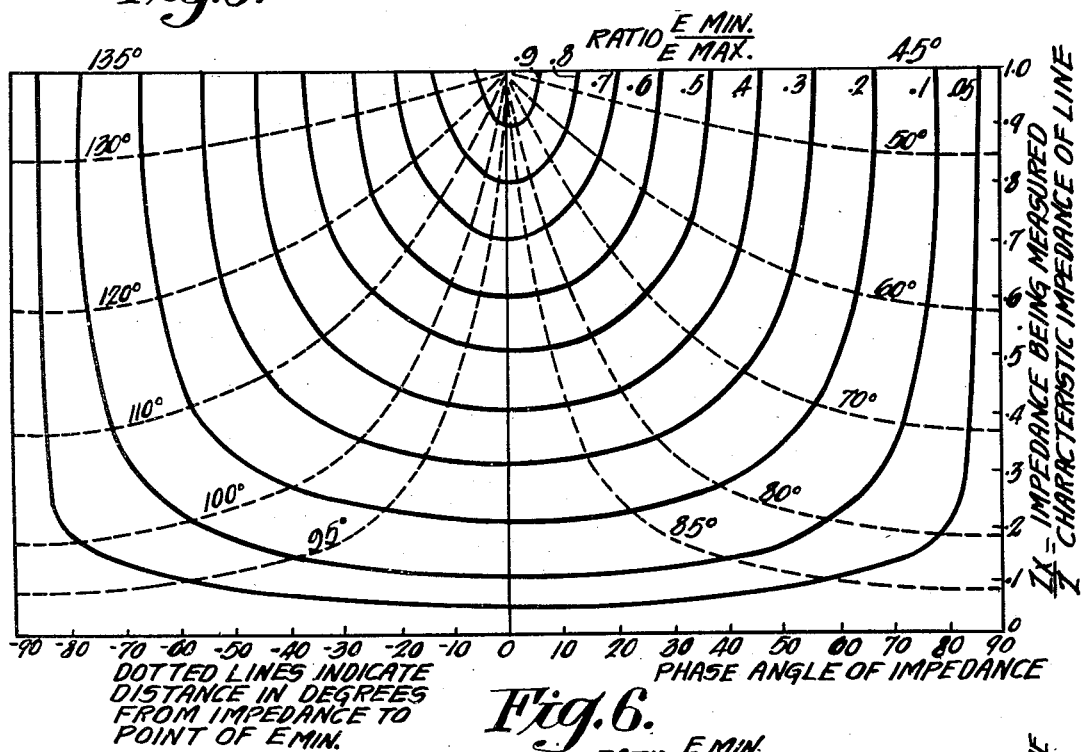

Feb. 5, 1946. W. R. KOCH 2,394,455
METHOD OF AND MEANS FOR MEASURING MECHANICAL IMPEDANCE
Filed Dec. 28, 1943 2 Sheets-Sheet 1
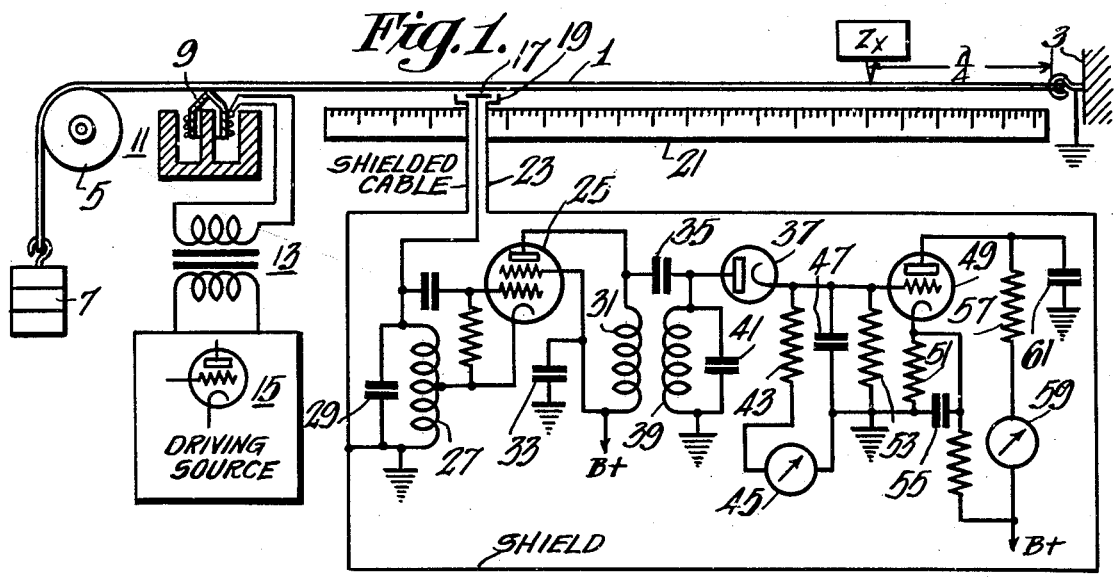
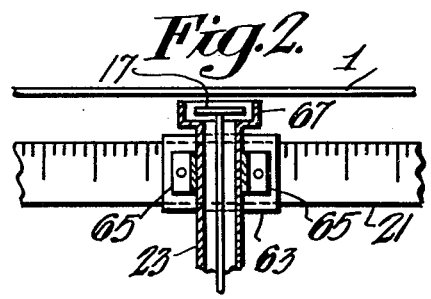
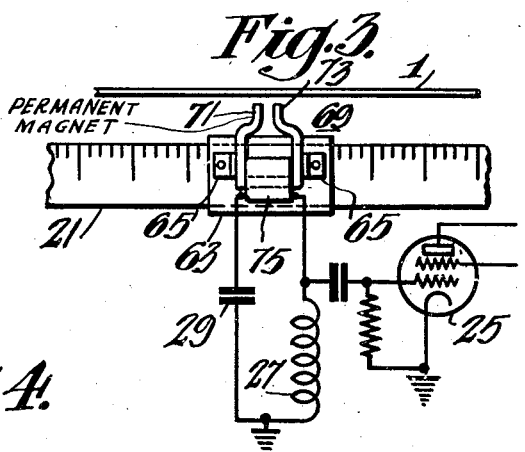
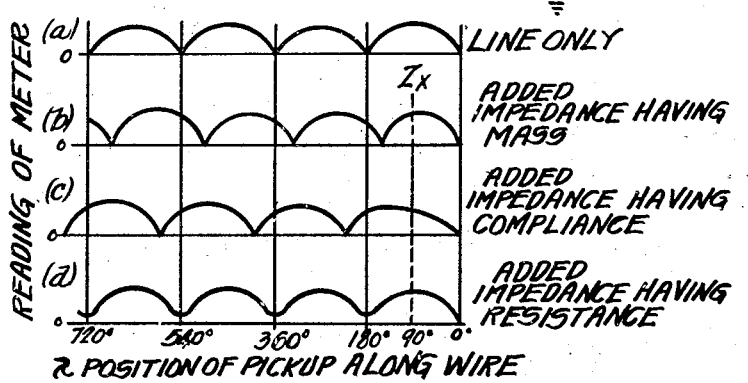
INVENTOR.
Winfield R. Koch
BY
ATTORNEY Patented Feb. 5, 1946

2,394,455

UNITED STATES PATENT OFFICE 2,394,455

METHOD OF AND MEANS FOR MEASURING MECHANICAL IMPEDANCE

Winfield R. Koch, Haddonfield, N. J., assignor to Radio Corporation of America, a corporation of Delaware Application December 28, 1943, Serial No. 515,903

10 Claims. (Cl. 73—67)

This invention relates generally to methods of and means for measuring mechanical impedances and more particularly to an improved system for determining the mechanical impedance of vibrating systems such as armatures, diaphragms, suspensions, or sound translating devices wherein said vibrating systems are applied to vary the standing wave distribution upon a mechanically vibrated wire or tape.

It should be understood that the terms "mechanical impedance" or "impedance" employed herein represent the complex coefficient of the force by the linear velocity. The unit of mechanical impedance is the mechanical ohm ("Elements of Acoustical Engineering," by Harry F. Olson, Van Nostrand, 1940, page 59, and Applied Acoustics," by Olson and Massa, Blakiston, 1934, page 24).

The instant invention is an improvement upon the invention described in the copending U. S. application of Alpha M. Wiggins, Ser. No. 481,119, filed March 30, 1943, upon which Patent 2,335,194 was granted August 8, 1944, entitled "Mechanical impedance bridge," and assigned to the same assignee as the instant application. Said copending application discloses means for measuring mechanical impedance wherein two substantially identical metallic reeds are driven by means of a conventional dynamic loudspeaker mechanism. The vibrating reeds form the grounded movable electrodes of two variable capacitors which electrodes cooperate with separate fixed capacitor electrodes. The variable capacitors are connected, through separate amplifying devices, to a thermionic tube mixing circuit which combine the signals derived from the two amplifiers in phase opposition. When the two reeds are driven with no external load applied to either reed, the output signals from the two amplifiers may be cancelled in the mixing circuit. When a load, such as a mechanical impedance to be measured, is applied to the free end of one of the reeds, the signal derived from the mixing circuit is proportional in amplitude to the vectorial difference between the force on the loaded reed and the force on the unloaded reed. The mechanical impedance in ohms of the loading device therefore is a function of the ratio of the amplitudes of the mixed signal with one reed loaded and the amplitude of the signal from the unloaded reed.

The instant invention provides means for measuring mechanical impedances over considerably wider ranges of impedance and frequency than can be accomplished in other known types of mechanical impedance measuring systems. The instant system employs a stretched metallic wire or tape of predetermined length, mass, and cross-sectional area, which is driven by means of a conventional electromechanical transducer to establish standing vibrations upon the stretched wire. A load, represented by the mechanical impedance to be measured, is applied to the vibrating wire at a point substantially ¼ wavelength from the fixed end thereof remote from the driving mechanism.

A capacitive or inductive pickup, cooperating with a fixed longitudinal scale, is arranged to search the vibrating wire to provide signal voltages proportional in magnitude to the magnitude of the standing waves along the vibrating wire. The capacitive or magnetic pickup may be connected in the oscillatory circuit of a conventional thermionic tube generator to vary the output frequency thereof in accordance with the vibration amplitude of the wire at the selected points along its length.

The oscillations thus generated therefore will be frequency-modulated at the driving frequency, and the frequency deviation will be proportional to the vibration amplitude of the stretched wire. The frequency-modulated signals may be applied to a resonant circuit, or other type of discriminator, and rectified to provide output signals characteristic of the vibration amplitude of the vibratory stretched wire.

A first indicating meter may be connected to the discriminator rectifier to indicate the coupling of the pickup to the vibratory wire in order to adjust the scalar indications of the system. A second indicating meter may be connected, through a thermionic amplifier tube, to the discriminator rectifier to indicate the relative magnitudes of the standing waves upon the vibratory stretched wire as the pickup is moved longitudinally thereof.

The mechanical impedance of the vibratory wire, with no external load applied, may be calculated from the mass and tension thereof and the driving frequency by substituting in the formulas listed hereinafter the characteristics of the standing waves on the vibratory wire.

The characteristics of the loading impedance, which is to be measured, may be determined by measuring the changes produced in the standing wave distribution on the line at various points along the length thereof. For example, loading of the vibratory wire by means of an impedance comprising additional mass moves the points of minimum vibration of the wire in the direction of the load. Similarly, loading of the vibratory wire by means of an impedance which adds compliance to the system, effectively moves the points of minimum vibration of the wire in the direction away from the load. Loading of the vibratory wire by means of an impedance which adds resistance to the system varies the ratio between the maximum and minimum vibration amplitudes of the vibratory wire. If the added resistance is equal to the characteristic impedance of the line, the line will, of course, exhibit no standing waves.

The methods and means for correlating the data obtainable by means of the apparatus to be described in detail hereinafter, will be developed and explained by means of the formulas and graphs included herein.

Among the objects of the invention are to provide an improved method of and means for measuring the mechanical impedance of a mechanical element. Another object of the invention is to provide an improved method of and means for measuring the mechanical impedance of a mechincal element wherein the loading effect of the mechanical element upon a vibratory system is measured by electrical means, and the various measurements are correlated to indicate the loading mechanical impedance. Another object of the invention is to provide an improved method of and means for measuring the mechanical impedance of a mechanical element by establishing standing waves upon a stretched vibratory element, loading said vibratory element at a predetermined distance from one fixed end thereof by means of said mechanical element, detecting the magnitude and position of standing vibrational waves upon said stretched element under unloaded and loaded conditions, and correlating the data thus obtained to provide relative indications of the mechanical impedance of the load and that of the stretched element.

Other objects of the invention include providing improved capacitive means combined with an electrical circuit for measuring the vibrational amplitudes of the vibratory element in a system of the type described. An additional object of the invention is to provide an improved electromagnetic means combined with an electrical circuit for measuring the vibrational magnitudes of a vibratory element in a mechanical impedance measuring system of the type described.

Figure 6:
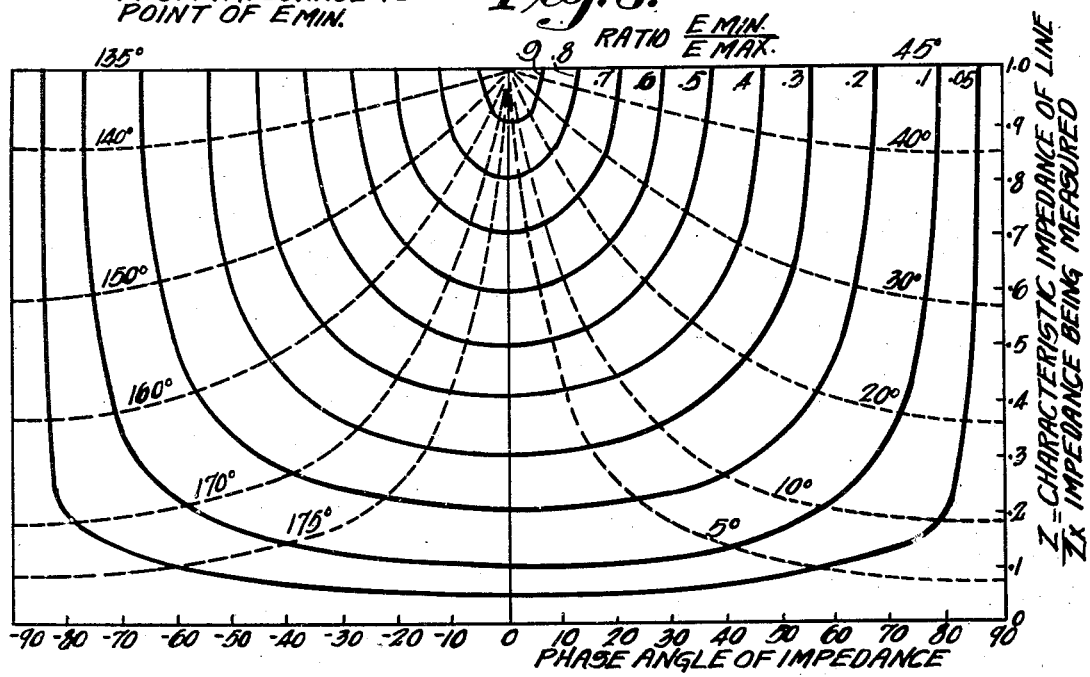

The invention will be described in greater detail by reference to the accompanying drawings of which Figure 1 is a schematic diagram of a preferred embodiment thereof, Figure 2 is an enlarged fragmentary view of a capacitive pickup device according to the invention, Figure 3 is an enlarged fragmentary view of an electromagnetic pickup device according to the invention, Figure 4 includes graphs indicating the vibratory standing waves upon the stretched element under loaded and unloaded conditions, and Figures 5 and 6 are graphs used in correlating the data derived from the circuit of Figure 1 to determine the mechanical impedance of the loading element. Similar reference characters are applied to similar elements throughout the drawings.

Referring to Figure 1, one end of a metallic wire or tape 1 is secured to a support 3. The remaining end of the wire 1 is passed over a pulley 5, and stretched, by means of a weight 7, secured to the end of the wire. A driving mechanism 9, such, for example, as the driving coil of an electrodynamic transducer 11, is secured to the stretched wire 1 adjacent the pulley 5. The driving coil 9 of the transducer 11 is connected through a transformer 13 to a driving source 15 such as, for example, an audio frequency thermionic tube oscillator. It should be understood that the stretched wire 1 may be vibrated by any other known electrical, mechanical, or magnetic driving means to provide standing waves thereon. A shielded conductive electrode 17, shielded by a housing member 19, and longitudinally adjustable with the housing member 19 in proximity to the stretched wire 1, cooperates with a fixed scale 21 disposed parallel to the stretched wire 1.

The shielded pickup electrode 17 is connected, through a shielded line 23, to a high frequency thermionic oscillator circuit including a first thermionic tube 25. The control electrode-cathode circuit of the oscillator tube 25 includes a shunt-connected inductor 27 and capacitor 29. The additional capacitance provided by the pickup electrode 17 in cooperation with the stretched wire 1 is connected in parallel with the shunt circuit 27, 29, to vary the oscillator frequency in accordance with the variation in spacing between the stretched wire 1 and the pickup electrode 17 as the wire 1 is vibrated by the driving coil 9.

The cathode of the thermionic tube oscillator 25 is connected to a tap on inductor 27 to provide regeneration for establishing sustained oscillations. The anode of the oscillator tube 25 is connected to the voltage supply B+ by inductor 31 which acts as an R. F. choke and is also coupled, through a coupling capacitor 35, to the anode of a diode rectifier 37. A frequency discriminating circuit comprising a shunt-connected third inductor 39 and tuning capacitor 41 is connected between the anode of the diode rectifier 37 and ground. The cathode of the diode rectifier 37 is connected through a resistor 43 and a first current indicating meter 45 to ground. The resistor 43 and the first current indicating meter 45 are bypassed by a capacitor 47. The first current indicating meter 45 provides an indication of the relative spacing of the stretched wire 1 and the pickup electrode 17 as the pickup is moved longitudinally along the fixed scale 21 and hence along the stretched wire 1. By maintaining the indication on the first indicating meter 45 at a substantially constant value, the relative spacing of the pickup electrode 17 may be adjusted to a constant value along the desired length of the stretched wire 1, when the wire is not vibrated by the transducer 11.

The cathode of the diode rectifier 37 also is connected to the control electrode of a thermionic voltmeter tube 49. Bias for the cathode-control electrode circuit of the voltmeter tube 49 is provided by means of a series-connected cathode resistor 51 and a shunt connected grid resistor 53. The cathode resistor 51 is bypassed by means of a cathode bypass capacitor 55. The anode of the voltmeter tube 49 is connected, through resistor 57 and a second indicating meter 59, to a source of anode potential, not shown. The anode circuit of the tube 49 is bypassed to ground by means of a capacitor 61. The second indicating meter 59 thereby provides an indication of the relative amplitude of vibration of the stretched wire 1 in accordance with the standing waves established thereon by means of the energy applied from the driving coil 9 of the electromechanical transducer 11.

After preliminary adjustment of the relative spacing of the pickup electrode 17 and the stretched wire 1, standing waves are established upon the stretched wire by energizing the driving coil 9 of the electromechanical transducer 11. As the pickup electrode 17 is moved longitudinally adjacent the vibrating stretched wire 1, the indications provided by the second indicating meter 59 indicate the relative amplitudes of the various portions of the standing waves established upon the stretched wire 1.

The unknown mechanical impedance $Z_x$ is applied to the vibratory stretched wire 1 at a point substantially ¼ wavelength removed from the fixed support 3. The loading provided by the mechanical impedance $Z_x$ therefore varies the standing wave pattern on the stretched wire as indicated and explained in detail hereinafter by reference to Figure 4. The modified standing wave distribution upon the stretched wire 1 thence may be determined by adjustment of the pickup electrode 17 longitudinally along the stretched wire and by the corresponding readings upon the second indicating meter 59. The readings of the second indicating meter 59 with respect to the longitudinal position of the pickup electrode 17 along the stretched wire 1 for both loaded and unloaded conditions of the vibratory system may be correlated, as explained in detail hereinafter, to determine the mechanical impedance of the loading element $Z_x$.

Figure 2 is an enlarged fragmentary view of a capacitive pickup electrode of the type described in Figure 1. One embodiment of the device includes the fixed scale 21, which acts as a guide for a sliding element 63 which supports the shielded cable 23 by means of brackets 65. An enlarged annular portion 67 of the shielded cable 23 effectively shields the pickup electrode 17 from external fields, and acts as one electrode of a three-electrode variable capacitor which includes the pickup electrode 17, the vibratory stretched wire 1 and the annular shielding portion 65. Suitable adjustment of the relative spacing of the fixed scale 21 and hence the pickup electrode 17, with respect to the stretched wire 1, should be provided for preliminary uniform adjustment of the spacing of these elements throughout the cooperative lengths thereof.

Figure 3 is similar to Figure 2 with the exception that the pickup element is electromagnetic instead of capacitive. The fixed scale 21 carries the sliding element 63, which supports, by means of brackets 65, a small electromagnet 69 having closely-spaced pole pieces 71, 73 in close proximity to the stretched wire 1. It should be understood that in this modification of the invention the stretched wire 1 should be of magnetic material. The electromagnet coil 75 is serially connected with the high frequency oscillator grid inductor 27 and grid tuning capacitor 29 to vary the resonant frequency of the oscillator tube 25 in accordance with the variations in the spacing between the stretched wire 1 and the electromagnet pole pieces 71, 73.

The period of the standard waves established upon the loaded or unloaded stretched wire 1 may be varied in a manner well known in the art by selecting suitable materials and cross-sectional dimensions for the stretched wire and by variation of the tension thereof by means of different weights 7. Referring to Figure 4, graph (a) indicates typical standing wave distribution along the unloaded stretched wire 1. Graph (b) indicates typical standing wave distribution along the stretched wire 1 when the added impedance $Z_x$ includes only additional mass. Graph (c) illustrates the variation in the standing wave distribution along the stretched wire 1 when the added impedance $Z_x$ includes only additional compliance. Graph (d) illustrates the variation in standing wave distribution along the stretched wire 1 when the added impedance $Z_x$ comprises additional resistance. The dash vertical line $Z_x$ on graphs (b), (c) and (d), indicates the position ¼ wavelength removed from the support 3 at which the loading impedance to be measured is applied to the vibratory stretched wire 1.

In evaluating the unknown impedance $Z_x$ to be measured, the characteristic impedance of the unloaded stretched wire 1 first must be determined. If the mass of the wire in grams per centimeter of length, $m$, and the tension of the wire in dynes, $T$, are known, the characteristic impedance of the unloaded wire is $$Z = \sqrt{Tm}$$

If only $T$ or only $m$ is known, the characteristic impedance of the stretched wire may be determined from the distance ($l$) in centimeters between nodes on the wire. The distance ($l$) corresponds to ½ wavelength of the standing waves on the unloaded wire. The characteristic impedance of the wire therefore is $$Z = 2lfm = \frac{T}{2lf}$$

where $f$ is the frequency of the standing waves.

When the characteristic impedance $Z$ of the stretched wire has been determined, several methods may be used to determine the unknown loading impedance $Z_x$ being measured.

Method I

The first method is similar to that described by W. L. Barrow in the Proceedings of the Institute of Radio Engineers for July, 1935, at pages 807–826, which discloses a somewhat analogous system for the measurement of radio frequency impedance with networks simulating electrical lines. The output voltage, as indicated by the second indicating meter 59, is a measure of the amplitude of vibration of the wire, which is analogous to the current in an electrical line. In using this method, the output voltage is determined with the pickup electrode at some point near the impedance being measured, thereby providing a first output voltage $E_1$. The output voltage also is measured at a second point ⅛ wavelength closer to the driving point on the vibratory wire, thereby providing a second voltage $E_2$, and at a third point ¼ wavelength from the first point in the direction of the driving point, thereby providing a third voltage $E_3$. Therefore, the following conditions obtain:

Let $$A_1 = \left(\frac{E_2}{E_1}\right)^2 \text{ and } A_2 = \left(\frac{E_3}{E_1}\right)^2$$

Then the resistive component of the impedance being measured, in mechanical ohms, is $$R_z = [A_1(A_2 - A_1 + 1) - \tfrac{1}{4}(A_2 - 1)^2]^{\frac{1}{2}} Z$$

and the reactive component of the impedance being measured, in mechanical ohms, is $$X_z = [\tfrac{1}{2}(A_2 + 1) - A_1] Z$$

Method II

A second somewhat more convenient method of determining the mechanical impedance $Z_x$ of the loading element is by the use of graphs such as indicated in Figures 5 and 6 of the drawings. When employing this second method, it is necessary to determine the ratio of the circuit output voltage, as indicated by the second indicating meter 59, at a point where it is a minimum value to the point at which it is a maximum value. The distance in degrees (360°=1 wavelength) from the unknown impedance $Z_x$ to the first position providing a minimum output voltage also must be determined from the corresponding positions of the pickup electrode 17 along the calibrated scale 21.

Referring to the graphs in Figures 5 and 6, the line corresponding to the determined ratio of output voltages is followed to the point where it intersects the dash line corresponding to the phase angle distance from the loading impedance to the first output voltage minimum. The value of the impedance may then be found from the ordinate of this point as shown by the scale on the right hand edge of the graphs. The ordinates are illustrated generally in the drawings as the ratio of the values of Z and $Z_x$, but for a given value of Z they may be expressed in terms of the values of $Z_x$. The phase angle of the loading impedances may be found from the abscissa of this point as indicated by the scale on the lower edge of the graphs.

The two methods explained heretofore are basic, and may be modified, if desired, to correct for small errors introduced by such factors as the stiffness of the wire, the loading due to the quarter wave portion of the wire on the side of the unknown impedance remote from the driving source, the losses in the wire, and the losses in the surrounding air.

Thus the invention disclosed comprises improved methods of and means for measuring the mechanical impedance of mechanical elements by measurement of the loading effects of said impedance upon a vibratory element having known, or determinable impedance and standing wave characteristics. The system described provides relatively accurate measurements of mechanical impedance over relatively wide ranges of both impedance and frequency.

I claim as my invention:

1. Apparatus for measuring the mechanical impedance of a movable mechanical element wherein said apparatus includes a vibratory element, means for establishing standing wave vibrations of said vibratory element, means for detecting said standing wave distribution along said vibratory element, means for measuring the amplitude of said standing waves at selected points along said vibratory element before and after transversely loading said vibratory element by means of said mechanical element whereby the mechanical impedance of said mechanical element may be determined as a function of the variations in standing wave distribution and magnitude in response to said loading of said vibratory element.

2. Apparatus for measuring the mechanical impedance of a movable mechanical element wherein said apparatus includes a stretched vibratory element, a source of signal energy and an electromechanical transducer means responsive to said signal source and in operable relation to said vibratory element for establishing standing wave vibrations of said vibratory element, means for detecting said standing wave distribution along said vibratory element, means for measuring the amplitude of said standing waves at selected points along said vibratory element before and after transversely loading said vibratory element by means of said mechanical element whereby the mechanical impedance of said mechanical element may be determined as a function of the variations in standing wave distribution and magnitude in response to said loading of said vibratory element.

3. Apparatus for measuring the mechanical impedance of a movable mechanical element wherein said apparatus includes a stretched vibratory element, means for establishing standing wave vibrations of said vibratory element, capacitive means in adjustably operable relation to said vibratory element for detecting said standing wave distribution along said vibratory element, means for measuring the amplitude of said standing waves at selected points along said vibratory element before and after transversely loading said vibratory element by means of said mechanical element whereby the mechanical impedance of said mechanical element may be determined as a function of the variations in standing wave distribution and magnitude in response to said loading of said vibratory element.

4. Apparatus for measuring the mechanical impedance of a movable mechanical element wherein said apparatus includes a stretched vibratory element, means for establishing standing wave vibrations of said vibratory element, capacitive means in adjustably operable relation to said vibratory element for detecting said standing wave distribution along said vibratory element, means including a frequency discriminator responsive to said capacitive means for measuring the amplitude of said standing waves at selected points along said vibratory element before and after transversely loading said vibratory element by means of said mechanical element whereby the mechanical impedance of said mechanical element may be determined as a function of the variations in standing wave distribution and magnitude in response to said loading of said vibratory element.

5. Apparatus for measuring the mechanical impedance of a movable mechanical element wherein said apparatus includes a stretched magnetic vibratory element, means for establishing standing wave vibrations of said vibratory element, electromagnetic means in adjustably operable relation to said vibratory element for detecting said standing wave distribution along said vibratory element, means for measuring the amplitude of said standing waves at selected points along said vibratory element before and after transversely loading said vibratory element by means of said mechanical element whereby the mechanical impedance of said mechanical element may be determined as a function of the variations in standing wave distribution and magnitude in response to said loading of said vibratory element.

6. Apparatus for measuring the mechanical impedance of a movable mechanical element wherein said apparatus includes a stretched vibratory element, a source of signal energy and an electromechanical transducer means responsive to said signal source and in operable relation to said vibratory element for establishing standing wave vibrations of said vibratory element, means for detecting said standing wave distribution along said vibratory element, means for measuring the amplitude of said standing waves at selected points along said vibratory element before and after transversely loading said vibratory element by means of said mechanical element placed at a point on said vibratory element removed substantially one quarter wavelength from the end thereof remote from said transducer whereby the mechanical impedance of said mechanical element may be determined as a function of the variations in standing wave distribution and magnitude in response to said loading of said vibratory element.

7. Apparatus of the type described in claim 1 including additional means for adjusting the vibratory period of said vibratory element.

8. Apparatus of the type described in claim 1 including an indicator responsive to said standing wave detecting means for indicating the average coupling between said vibratory element and said detecting means at selected points along said vibratory element for preliminary scalar adjustment of said apparatus.

9. Apparatus of the type described in claim 4 including a thermionic tube measuring circuit responsive to said frequency discriminator for indicating said standing wave amplitudes.

10. The method of measuring the mechanical impedance of a mechanical element as a function of the variations in standing wave distribution and amplitude of vibration of a vibratory element comprising establishing standing vibratory waves of said vibratory element, measuring and indicating the distribution and amplitudes of said standing waves, selectively applying said mechanical element to transversely load said vibratory element thereby changing said standing wave distribution and amplitude relations, measuring and indicating said changed relations, and determining the mechanical impedance of said mechanical element as a function of said original and changed standing wave relations.

WINFIELD R. KOCH.